US012625039B2

(12) United States Patent     (10) Patent No.: US 12,625,039 B2

Gutierrez     (45) Date of Patent: May 12, 2026

(54) APPARATUS AND METHOD FOR CONTINUOUS MONITORING AND DETECTION OF MICROPLASTICS IN WATER

(71) Applicant: Aizaco Limited Company, Frisco, TX (US)

(72) Inventor: Carlos Alberto Hernandez Gutierrez, Frisco, TX (US)

(73) Assignee: Aizaco Limited Company

( * ) Notice: Subject to any disclaimer, the term of this patent is extended or adjusted under 35 U.S.C. 154(b) by 273 days.

(21) Appl. No.: 18/204,731

(22) Filed: Jun. 1, 2023

(65) Prior Publication Data

US 2023/0393029 A1    Dec. 7, 2023

Related U.S. Application Data

(60) Provisional application No. 63/347,862, filed on Jun. 1, 2022.

(51) Int. Cl.
    *G01N 1/20*       (2006.01)
    *C02F 1/00*       (2023.01)
         (Continued)

(52) U.S. Cl.
    CPC ........... *G01N 1/2035* (2013.01); *C02F 1/004* (2013.01); *C02F 1/008* (2013.01); *G01N 1/4077* (2013.01);
         (Continued)

(58) Field of Classification Search
    CPC .... C02F 1/004; C02F 1/008; C02F 2001/007; C02F 2209/001; C02F 2209/11;
         (Continued)

(56) References Cited

U.S. PATENT DOCUMENTS

| 4,035,156 A | * | 7/1977 | Shumate, II | .............. | B04B 5/04 |
| | | | | | 494/36 |
| 5,167,802 A | * | 12/1992 | Sandstrom | ............... | G01N 1/18 |
| | | | | | 436/39 |

(Continued)

FOREIGN PATENT DOCUMENTS

| CA | 3197227 | 9/2022 |
| CN | 107670391 | 2/2018 |

(Continued)

OTHER PUBLICATIONS

Beljanski et al., Efficiency and Effectiveness of a Low-Cost, Self-Cleaning Microplastic Filtering System for Wastewater Treatment Plants, Proceedings of The National Conference On Undergraduate Research (NCUR) 2016 University of North Carolina Asheville Asheville, North Carolina Apr. 7-9, 2016 (Year: 2016).*

(Continued)

*Primary Examiner* — Stephanie E Bloss
*Assistant Examiner* — Kevin C Butler
(74) *Attorney, Agent, or Firm* — Cole Schotz P.C.; Marcella M. Bodner, Esq.

(57) ABSTRACT

An automatic sampling device (autosampler) is provided for continuous water sample collection and visual inspection for the presence of particulate solids in water sources. The autosampler is capable of collecting larger water samples, over a longer period of time, than typical inline monitoring and sampling methods. This provides more accurate information regarding the presence and concentration of particulate solids in the water sample as compared to most inline methods. More particularly, the autosampler includes a plurality of plastic pellet and powder capture nets (P3CNs), each of which is designed with nested nets for catching and retaining particulate solids of sequentially diminishing particle size along the flow path of the water sample. This enables easy determination of the presence of particulate (Continued)

solids, as well as a quick assessment of the different sizes of particulate solids present in the water samples by visual inspection of the P3CNs.

24 Claims, 5 Drawing Sheets

(51) Int. Cl.
    *G01N 1/10*          (2006.01)
    *G01N 1/40*          (2006.01)
(52) U.S. Cl.
    CPC .. *C02F 2001/007* (2013.01); *C02F 2209/001* (2013.01); *C02F 2209/11* (2013.01); *C02F 2209/40* (2013.01); *C02F 2209/44* (2013.01); *C02F 2301/046* (2013.01); *C02F 2303/24* (2013.01); *G01N 2001/1025* (2013.01); *G01N 2001/1081* (2013.01); *G01N 2001/2064* (2013.01); *G01N 2001/4088* (2013.01)
(58) Field of Classification Search
    CPC .............. C02F 2209/40; C02F 2209/44; C02F 2301/046; C02F 2303/24; G01N 1/4077; G01N 2001/1025; G01N 2001/1081; G01N 2001/2064; G01N 2001/4088
    USPC ...................................................... 73/863.81
    See application file for complete search history.

(56) References Cited

U.S. PATENT DOCUMENTS

| | | | |
|---|---|---|---|
| 5,299,141 A | | 3/1994 | Hungerford et al. |
| 5,900,137 A | | 5/1999 | Homan |
| 7,673,369 B2 * | | 3/2010 | Gogel ................... A47L 9/1666 |
| | | | 15/352 |
| 11,679,993 B2 | | 6/2023 | Gutierrez |
| 12,017,928 B2 * | | 6/2024 | Gutierrez ............... G01N 35/10 |
| 12,291,464 B2 * | | 5/2025 | Gutierrez ............... G01N 35/10 |
| 2005/0279182 A1 * | | 12/2005 | Cole .................. G01N 15/0272 |
| | | | 73/864.71 |
| 2007/0017064 A1 * | | 1/2007 | Gogel ....................... A47L 9/20 |
| | | | 15/352 |
| 2009/0123340 A1 | | 5/2009 | Knudsen |
| 2010/0170537 A1 | | 7/2010 | Gingras |
| 2013/0045496 A1 | | 2/2013 | Jansen |
| 2013/0068679 A1 | | 3/2013 | Hannemann |
| 2015/0125874 A1 | | 5/2015 | Subramaniam |
| 2015/0135807 A1 | | 5/2015 | Firstenberg |
| 2015/0191382 A1 | | 7/2015 | Blanc |
| 2020/0115868 A1 | | 4/2020 | Curet et al. |
| 2022/0136940 A1 * | | 5/2022 | Liu ........................... G01N 1/10 |
| | | | 73/61.72 |
| 2022/0306488 A1 | | 9/2022 | Gutierrez |
| 2023/0286829 A1 | | 9/2023 | Gutierrez |
| 2023/0393029 A1 * | | 12/2023 | Gutierrez ................. G01N 1/18 |
| 2024/0002254 A1 | | 1/2024 | Gutierrez |

FOREIGN PATENT DOCUMENTS

| | | | | |
|---|---|---|---|---|
| CN | 11092492 | | 8/2019 | |
| CN | 110879158 | | 3/2020 | |
| CN | 110879158 A | * | 3/2020 | |
| CN | 111175199 | | 5/2020 | |
| CN | 111175199 A | * | 5/2020 | ............... G01N 1/28 |
| CN | 211784540 | | 10/2020 | |
| CN | 211784540 U | * | 10/2020 | |
| CN | 211825170 | | 10/2020 | |
| CN | 211825170 U | * | 10/2020 | |
| CN | 111879566 | | 11/2020 | |
| CN | 118130202 A | * | 6/2024 | ............... G01N 1/28 |
| MX | Mxa2023009147 | | 3/2022 | |
| WO | WO-03078970 A2 | * | 9/2003 | ............... B01L 9/06 |
| WO | 2022204206 | | 9/2022 | |
| WO | 2023235494 | | 12/2023 | |
| WO | WO-2023235494 A1 | * | 12/2023 | .............. C02F 1/004 |

OTHER PUBLICATIONS

Foglia et al., Microplastics in urban water cycles: Looking for a more scientific approach for sampling and characterization in wastewater and drinking water treatment plants, Science of the Total Environment 952 (2024) 175919 (Year: 2024).*

Okoffo et al., Wastewater treatment plants as a source of plastics in the environment: a review of occurrence, methods for identification, quantification and fate, Environmental Science Water Research & Technology, Sep. 9, 2019 (Year: 2019).*

International Searching Authority, Written Opinion WO-2023235494—PCT/US2023/024158, Jan. 6, 2023, p. 7 (Year: 2023).*

International Searching Authority, International Search Report WO-2023235494—PCT/US2023/024158, Jan. 6, 2023, p. 4 (Year: 2023).*

Machine Translation, from Chinese into English, of Chinese Patent Application Publication No. 111175199A, published May 19, 2020.

Issue Notification issued on May 31, 2023 for corresponding U.S. Appl. No. 17/701,499.

Notice of Allowance issued on Feb. 27, 2023 for corresponding U.S. Appl. No. 17/701,499.

Final Office Action issued on Jan. 20, 2023 for corresponding U.S. Appl. No. 17/701,499.

Non-Final Office Action issued on Sep. 16, 2022 for corresponding U.S. Appl. No. 17/701,499.

Requirement for restriction issued on Aug. 2, 2022 for corresponding U.S. Appl. No. 17/701,499.

International Preliminary Report on Patentability issued on Sep. 12, 2023 for corresponding application No. PCT/US2022/021423.

International Search Report issued on Sep. 21, 2022 for corresponding International Patent Application No. PCT/US2022/021423.

Written Opinion of the International Searching Authority issued on Sep. 29, 2022 for corresponding International Patent Application No. PCT/US2022/021423.

U.S. Appl. No. 63/347,862, filed Jun. 1, 2022.

International Search Report issued on Sep. 13, 2023 for corresponding International Patent Application No. PCT/US2023/024158.

Written Opinion of the International Searching Authority issued on Dec. 7, 2023 for corresponding International Patent Application No. PCT/US2023/024158.

Annex to Partial International Search of PCT/US2022/021423, issued on Jun. 22, 2022 by the European Patent Office Acting as Searching Authority.

Invitation to Pay Additional Fees and where applicable protest fees in Partial International Search of PCT/US2022/021423, issued on Jun. 22, 2022 by the European Patent Office Acting as Searching Authority.

Issue Notification issued on Jun. 5, 2024 for corresponding U.S. Appl. No. 18/143,308.

Supplemental Notice of Allowance issued on Mar. 11, 2024 for corresponding U.S. Appl. No. 18/143,308.

Notice of Allowance issued on Feb. 27, 2024 for corresponding U.S. Appl. No. 18/143,308.

Non-Final Office Action issued on Nov. 16, 2023 for corresponding U.S. Appl. No. 18/143,308.

Office Action issued on May 25, 2023 for corresponding Canadian Patent Application No. 3,197,227.

Notice of Allowance issued on Oct. 13, 2023, for corresponding Canadian Patent Application No. 3197227.

\* cited by examiner

APPARATUS AND METHOD FOR CONTINUOUS MONITORING AND DETECTION OF MICROPLASTICS IN WATER

The present application claims the benefit of U.S. Provisional Application No. 63/347,862, filed on Jun. 1, 2023, the entire disclosure of which is hereby incorporated by reference herein.

FIELD OF THE INVENTION

The present invention relates to apparatus and methods for monitoring and detecting particulate solids, especially microplastics, present in water, such as wastewater effluent streams and bodies of surface water. More particularly, the present invention relates to continuous automatic and remote monitoring and detection of microplastics present in water.

BACKGROUND

The growth in first world economies and the urbanization of developing countries continues to strain global water supplies. Even technologies utilized at water treatment facilities continue to advance, such facilities remain overburdened and often fall short when it comes to treating water to the point that it is useful for agriculture and human consumption. This is due, in part, to the fact that pollution today is more than just bulk items such as water bottles and trash, and today's wastewater treatment plants are not designed to accurately detect and measure the presence of some new forms of pollutants.

Many particulate solids cause adverse impacts upon the environment but are also difficult to detect and remove from water. Microplastics are proving to be particularly difficult to detect and remove from water. Wastewater treatment plants and their technologies are now facing difficulties when it comes to detection and removal of certain particulate solid impurities, such as microplastics.

In fact, wastewater treatment plants which inadequately detect or remove microplastics, as well as some nonpoint sources (e.g., stormwater discharges), may now be among the primary sources of microplastics in fresh waters and the ocean. This is because microplastics escape removal by conventional wastewater treatment technologies, whereupon they enter surface freshwaters and oceans and contaminate water resources like groundwater which might otherwise be reusable, and negatively impact terrestrial and aquatic environments.

Accordingly, there is a growing need for water treatment technologies capable of detecting and removing smaller particulate matter, such as microplastics, which are not always captured by traditional mechanical (e.g., filtration, floatation, etc.) and chemical techniques (e.g., utilizing coagulants and oxidizing agents) for water treatment.

Monitoring and detection of solid contaminants, such as microplastics and others, which may be present in water is sometimes performed using inline devices, such as a TSS sensor or an automatic sampling apparatus. These devices and apparatus are installed in a pipe through which water to be monitored and sampled flows. However, such inline devices provide information based on an instantaneous and relatively small sample of the water flowing through the pipe and such samples sometimes contain very few particulate solids. Furthermore, when the water being monitored and tested contains a relatively low concentration of particulate solids, such as microplastics, instantaneous water samples taken from that water often contain very few particulate solids.

Water samples containing few particulate solids may not be sufficient to accurately detect the presence and concentration of particulate solids present in those water samples. However, it is important to be able to do so, even at such low concentrations, because the particulate solids, such as microplastics, may be present in amounts which nonetheless exceed the maximum allowable limit set by governmental authorities or other standard setting entities.

The development of technology capable of monitoring and successfully detecting the presence of particulate solids, such as microplastics, in water such as wastewater, treated wastewater, bodies of surface water, etc., would contribute to the much-needed reusable water supply, as well as more accurately monitoring and determining whether such water meets the limits set by governmental authorities or other standard setting entities.

BRIEF DESCRIPTION OF THE FIGURES

The present invention will be further explained with reference to the attached drawings, wherein like structures are referred to by like numerals and/or letters throughout the several views. The drawings shown are not necessarily to scale, with emphasis instead generally being placed upon illustrating the principles of the present invention.

DETAILED DESCRIPTION

Figure 1:
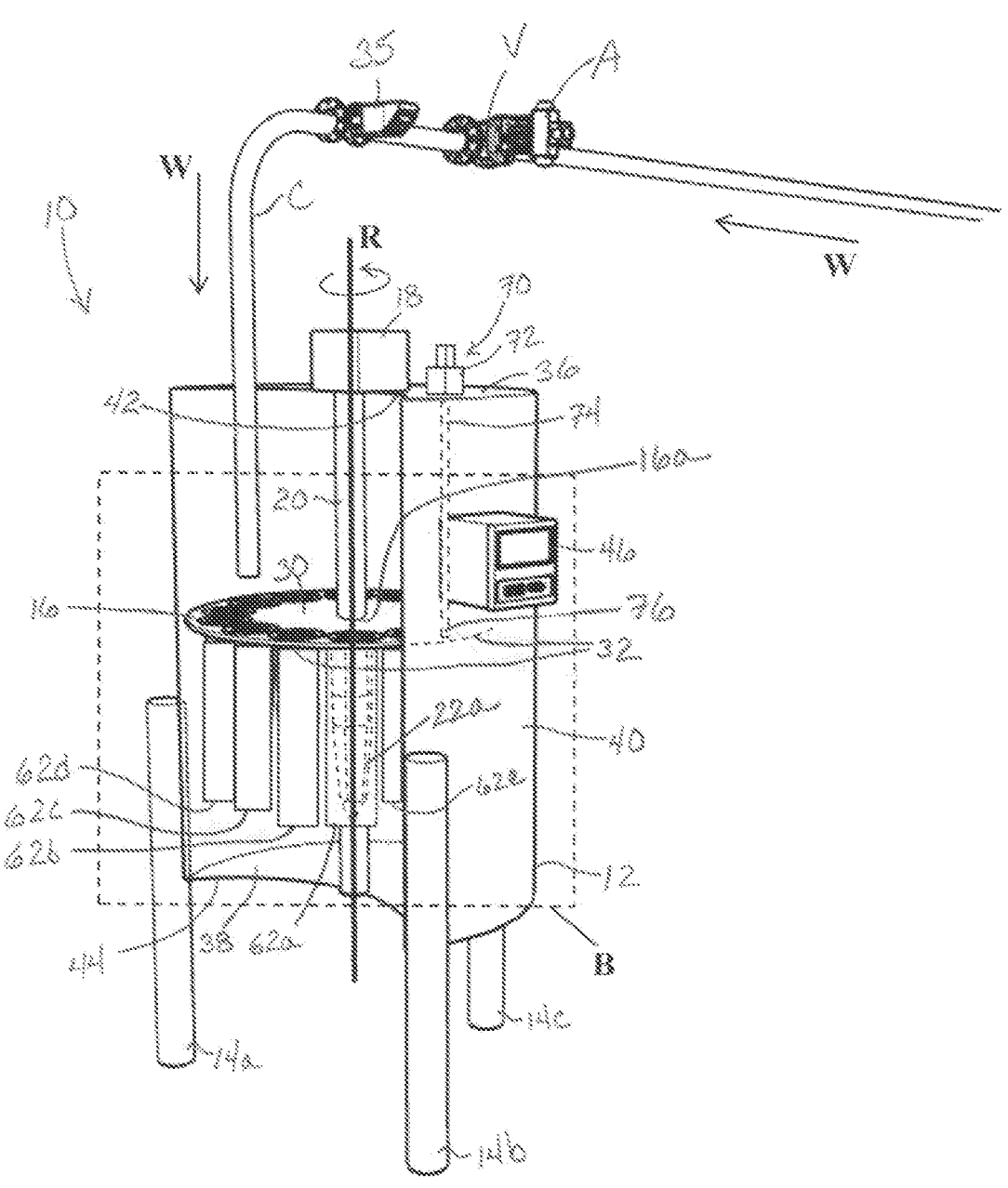
FIG. 1 is a perspective rear view of an exemplary embodiment of a continuous sampling device (i.e., an autosampler apparatus) in accordance with the description provided herein.
Figures 2, 3:
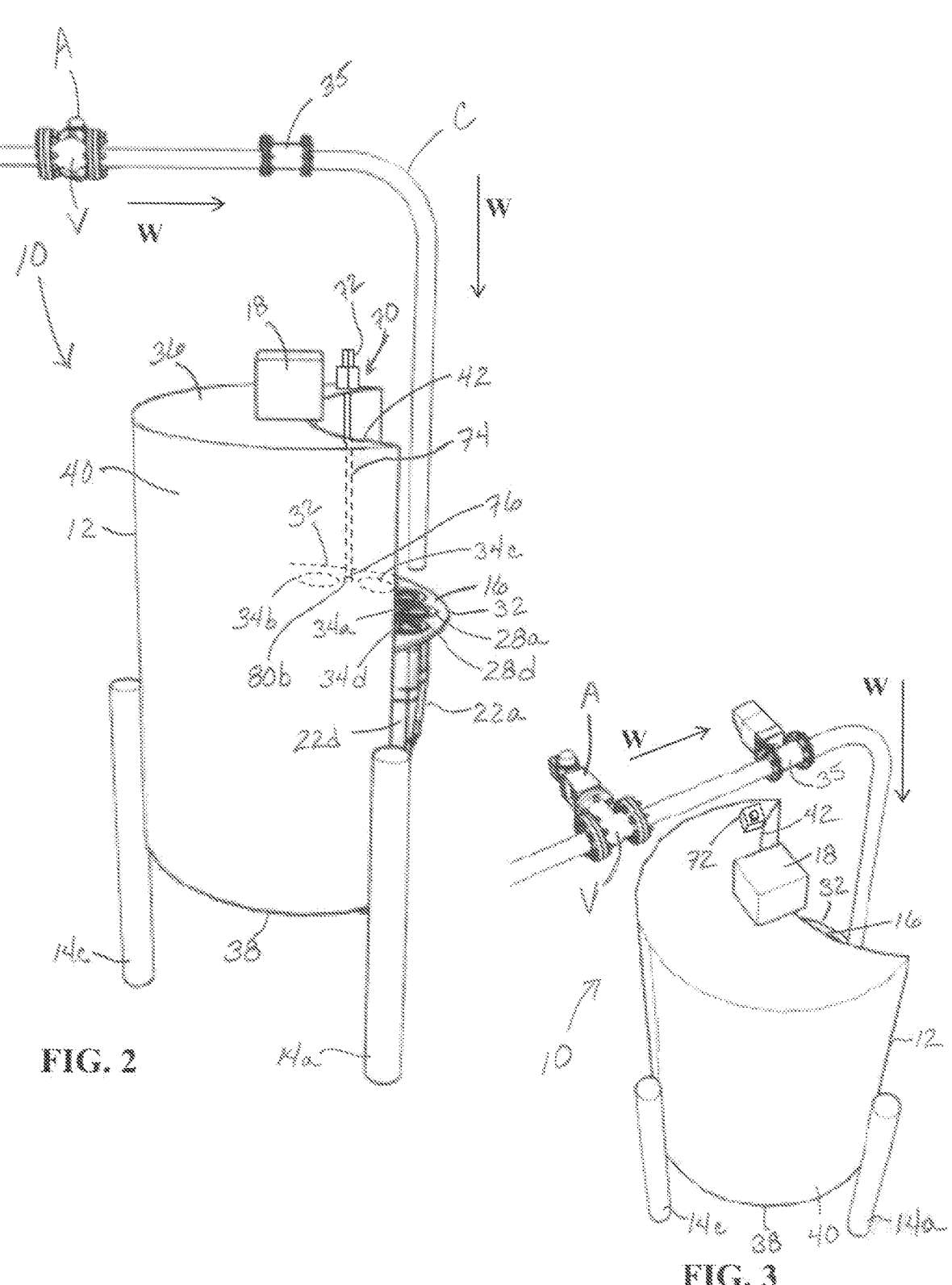
FIG. 2 is a perspective side view of the autosampler apparatus of FIG. 1.
FIG. 3 is a perspective left-rear view of the autosampler apparatus of FIG. 1.

In an effort to increase the accuracy and efficiency of monitoring and detecting particulate solids in water, particularly but not limited to microplastics, an automatic sampling device (i.e., autosampler apparatus) for continuous water sample collection and visual inspection for the presence of particulate solids. As will be explained in detail hereinbelow, the device described and contemplated herein collects larger water samples, over a longer period of time, than is generally possible using typical inline monitoring and sampling methods. Examination and testing of such larger water samples provide more accurate information regarding the presence and concentration of particulate solids in the water sample as compared to most inline methods.

As will also be explained in detail hereinbelow, the automatic sampling device described and contemplated herein includes a plurality of plastic pellet and powder capture nets (P3CNs), each of which is designed with nested nets for catching and retaining particulate solids of sequentially diminishing particle size along the flow path of the water sample. This enables easy determination of the presence of particulate solids, as well as a quick assessment of the different sizes of particulate solids present in the water samples by visual inspection of the P3CNs.

It should be noted that, although the invention presented and contemplated herein is described as applicable to the monitoring and detection of microplastics in particular, the utility of the invention is not limited to microplastics. Rather, the invention described and contemplated herein is also be capable of monitoring and detecting other kinds of particulate solids which may be present in water sources.

Furthermore, the following description focuses on water samples taken from treated wastewater streams, which is water that has passed through and been treated in a wastewater treatment facility. However, as will be recognized by persons of ordinary skill in the relevant art, the invention described and contemplated herein is equally applicable and effective for monitoring and detecting particulate solids in other water sources.

The term "water source" as used herein is not particularly limited and includes any water for which the particulate solids content would be of interest including, but not limited to: water effluent from wastewater treatment processes and plants, or industrial production processes and plants; water in manmade bodies and containers, such as settlement ponds, catchment basins, equilization tanks, other storage vessels, etc.; water in natural and manmade bodies of surface water such as streams, rivers, ponds, lakes, wetlands, oceans, etc.

As used herein, "microplastics" means pieces and fragments of plastic material having sizes less than about 5 millimeters (mm), such as, without limitation, as small as about 1 micron or even as small as about 0.1 micron or greater. Microplastics exist in different sizes and shapes such as, without limitation pellets, flakes and powders. Pellet microplastics are generally sized from about 1.5 mm to about 5 mm in their largest dimension (i.e., at least one of the length, width, and thickness of a microplastics pellet is 1.5 mm to about 5 mm, with the remaining dimension being equal to or smaller), while powder microplastics are generally about 500 microns or less in average diameter. Microplastics flakes are recognized by their irregular shapes, rather than their size and, therefore, may be any size from about 5 mm and less.

Microplastics include such plastic fragments and particulates regardless of whether they have been released directly into the environment (i.e., "primary" microplastics) or formed indirectly in the environment (i.e., "secondary' microplastics). Indirect formation of microplastics includes formation by decay or degradation (which tends to occur slowly), whether by physical, mechanical, chemical, or radiation exposure mechanisms.

Microplastics are often composed of synthetic polymer materials such as polyethylene, polystyrene, and elastomers like polyisoprene, all of which tend to resist biodegradation. Microplastics come in several shapes characterized as granular, fragment film, resin pellets, foam, and the most abundant, fiber, which is most often derived from the discharge of domestic washing machines containing the synthetic polymers for clothing. These particles include primary and secondary classifications, wherein primary microplastics are engineered to be small microbeads used in cosmetic, medicinal and industrial products like laundering textiles, while secondary microplastics are derived from the environmental breakdown of large plastics.

The chemical composition of these synthetic plastics often includes additives for protection from oxygen degradation and plasticizers for maintaining flexibility. These materials and the chemical makeup of other small anthropogenic litter, such as particles, pellets, and microbeads, lead to an extractive loss of plastics from wastewater treatment. While some tertiary treatments like membrane bioreactors, rapid sand filters, and disc filters might remove a portion of microplastics from treated wastewater effluent, there often remains at least trace amounts of such microplastics in the treated wastewater effluent leaving treatment facilities. Thus, microplastics continue to evade mechanical and chemical treatment processes and subsequently pollute terrestrial and marine ecosystems.

In general, effluent limitations for plastics in treated effluent from a wastewater facility in the United States have not been regulated specifically. Rather, they are regulated indirectly and lumped with other pollutants as part of the wastewater permit condition described therein mainly as "floating solids or foams." The effluent limitation for floatables (which includes plastics and microplastics as currently defined in such permits and regulations) is typically rather vague in most permits and simply defined as "no discharges of floating solids or foams other than trace amounts." As a result, what occurs in plastic manufacturing facilities is that their wastewater treatment processes are equipped with the typical dissolved air flotation and baffle systems which typically adequately address floating solids and foams together as a group or "package," but are typically ineffective at capturing and removing microplastic solids from such wastewater streams.

Accordingly, it has been found that microplastics bypass or overload many of the aforesaid water treatment and purification systems and processes designed to address typical floating solids and foams, but which are not designed or effective to address microplastics. This results in a greater need for monitoring and detection of the presence of microplastics (and other particulate solids) in water sources to determine whether further treatment, specialized treatment, or both are warranted to ensure the water is of sufficient quality for its intended use(s). The invention described and contemplated herein facilitates monitoring and detecting microplastics present in water sources more accurately than many currently used and proposed inline methods and apparatus.

With reference to FIGS. 1-6, an exemplary embodiment of an autosampler apparatus 10 for automated monitoring and detection of microplastics, and other particulate solids, in water will now be described. More particularly, FIGS. 1-4 provide several views of the autosampler 10, which includes an autosampler body 12 and is supported a distance above the ground or other surface upon which the autosampler 10 rests, by three or more legs 14a, 14b, 14c, each of which is securely mounted or otherwise affixed to the autosampler body 12. Although not shown in the figures, the autosampler 10 may be placed or disposed in a sump, pit, or reservoir, the bottom floor of which would then be the surface upon which the autosampler 10 rests or to which the autosampler 10 is affixed, mounted, or otherwise connected.

The autosampler 10 further includes a rotatable carousel 16 disposed within the autosampler body 12, as well as a rotation motor 18 mounted on the body 12 and in communication with the carousel 16 via a vertical shaft 20. More particularly, the vertical shaft 20 is rotatably connected to the rotation motor 18 and statically affixed to a geometric center 16a of the carousel 16 (see FIGS. 1 and 5A-5B). When the vertical shaft 20 is rotated by the rotation motor 18 the carousel 16 is rotated about an axis of rotation R which is coaxial with the vertical shaft 20. In the embodiment shown in FIGS. 1-4, the rotation motor 18 is mounted on top of the body 12, but may be mounted anywhere on the body 12, as long rotatable connection with the vertical shaft 20 is possible for rotation of the carousel 16 about its center 16a.

Figure 4:
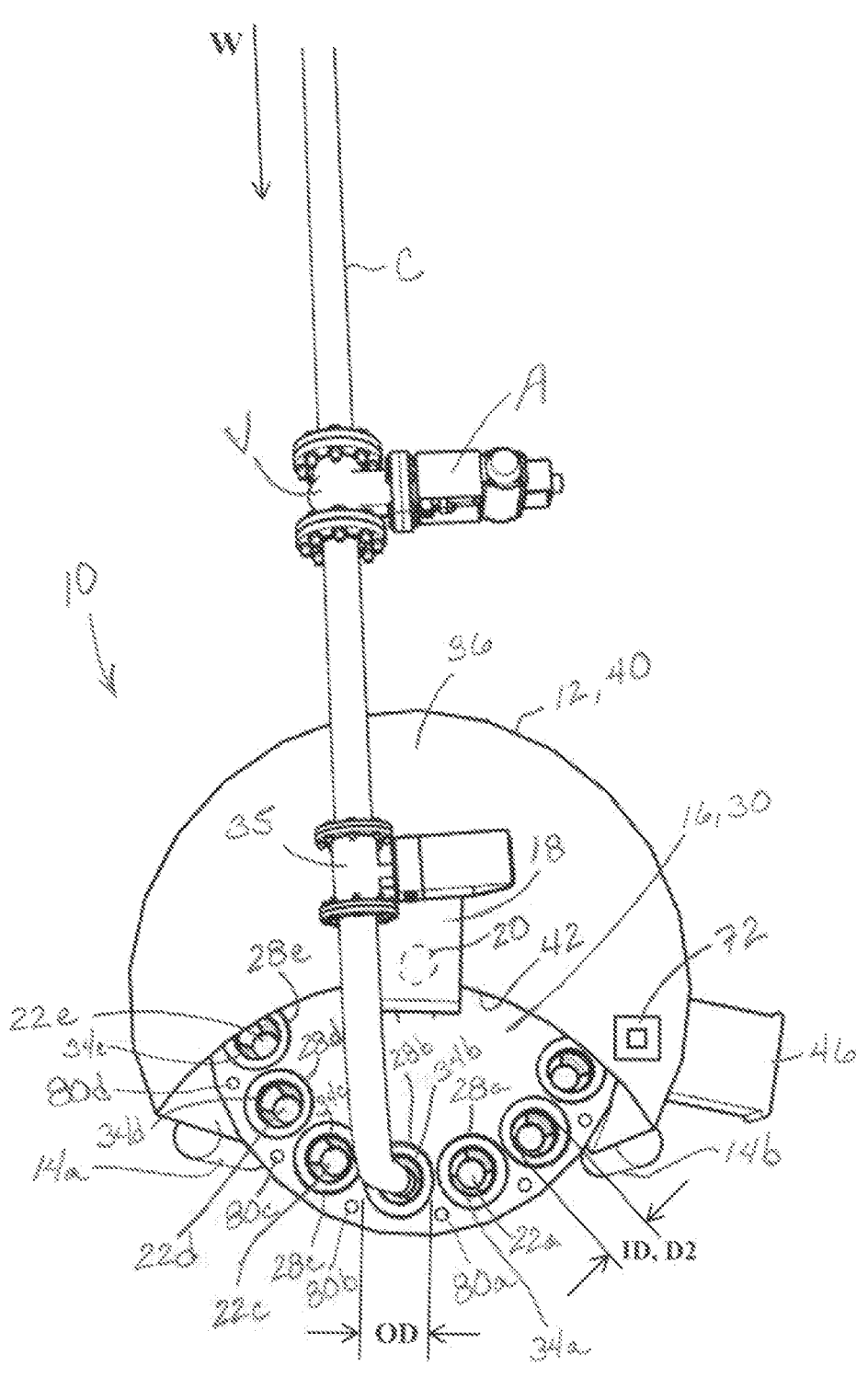
FIG. 4 is a top plan view of the autosampler apparatus of FIG. 1.
Figures 5A, 6:
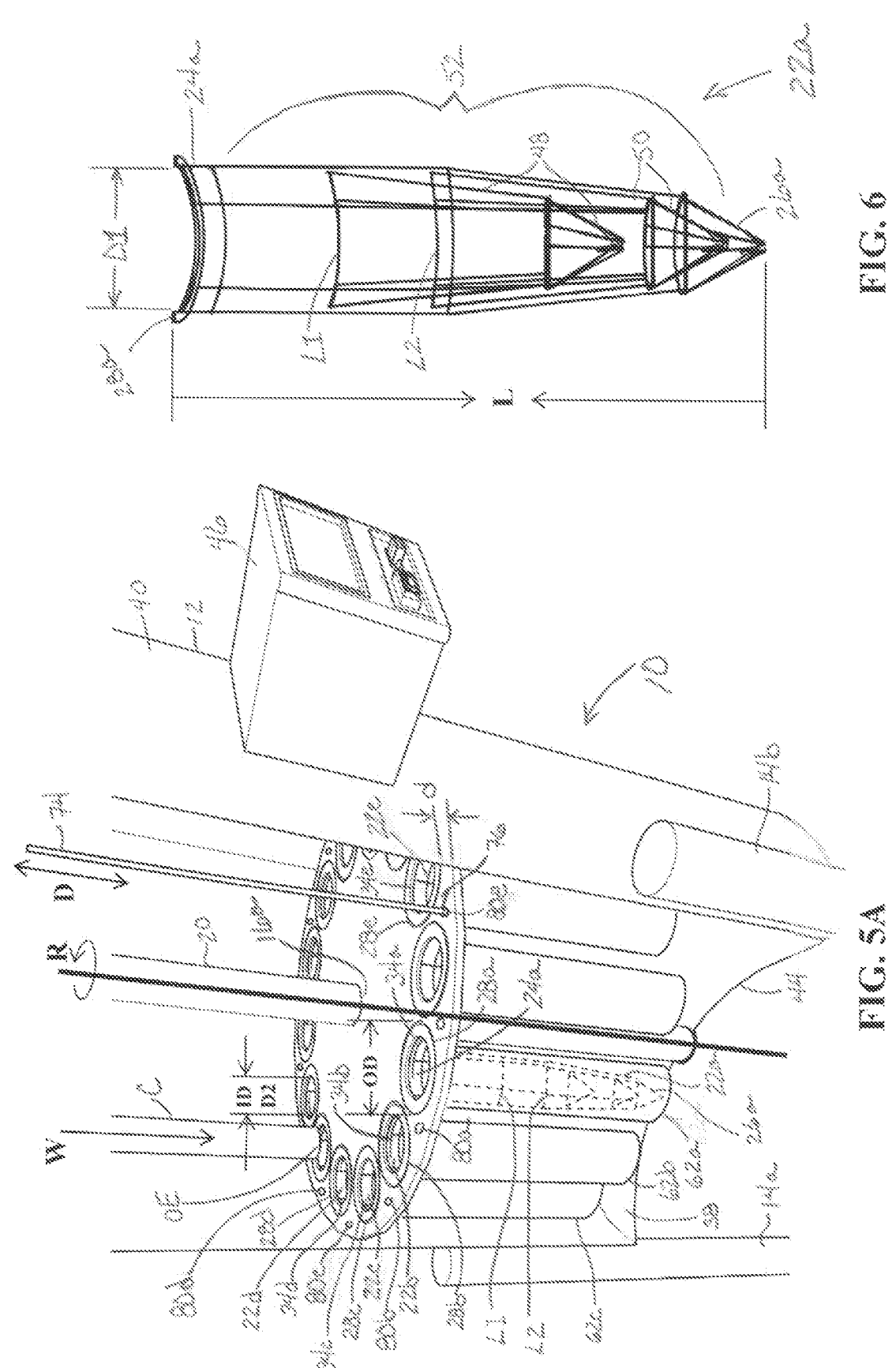
FIG. 5A is an enlarged and slightly tilted view of the area indicated by dotted box B shown in FIG. 1.
FIG. 6 is a cross-sectional view of a single plastic pellet and powder capture net (P3CN) from FIG. 5B, taken along line A-A and looking in the direction of the arrows.
Figure 5B:
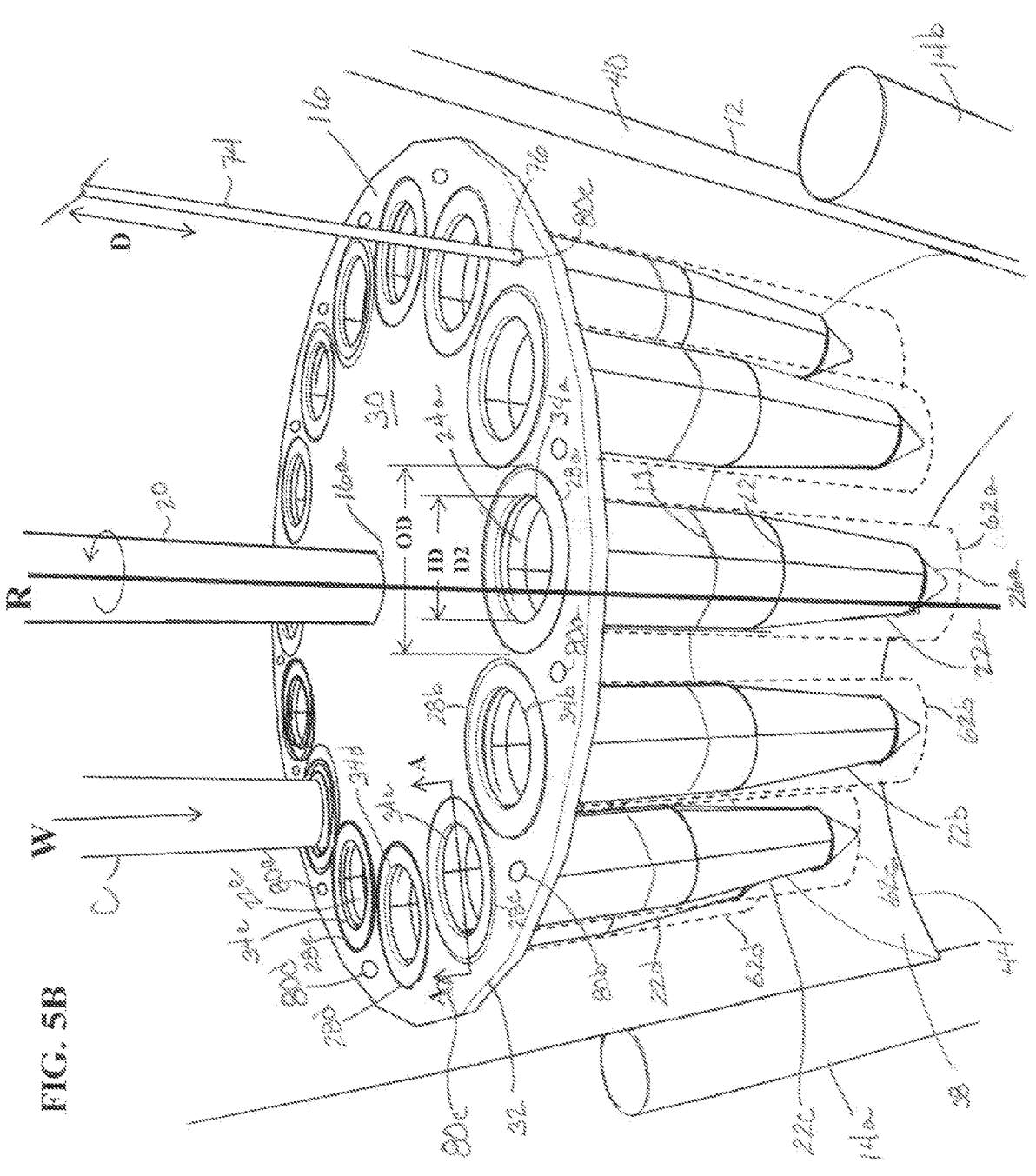
FIG. 5B is a perspective view of the carousel removed from the body of the autosampler and holding a plurality of plastic pellet and powder capture nets (P3CNs)

With reference also now to FIGS. 5A-5B, the autosampler 10 includes a plurality of plastic pellet and powder capture nets (P3CNs) 22a, 22b, 22c, 22d, 22e for receiving and filtering water which is provided through a conduit C from a water source (not shown). Each of the P3CNs 22a, 22b, 22c, 22d, 22e is mounted to the carousel 16, proximate the peripheral edge 32 thereof (see FIGS. 4, 5A-5B). In an exemplary embodiment, as shown in FIGS. 1 and 5A, the autosampler 10 may further include a plurality of flow guards 62a, 62b, 62c, 62d, 62e, each of which surrounds a corresponding one of the P3CNs 22a, 22b, 22c, 22d, 22e, respectively, and is also mounted to the carousel 16.

In the perspective view of the autosampler 10 provided by FIG. 1, the flow guards 62a, 62b, 62c, 62d, 62e mostly obscure the view of the P2CNs 22a, 22b, 22c, 22d, 22e, so a single P3CN 22a is shown in phantom in FIG. 1 to show its position and orientation. FIG. 5A provides an enlarged and slightly tilted view of the area indicated by dotted box B shown in FIG. 1. In FIG. each P3CN 22a, 22b, 22c, 22d, 22e is just partially visible in each of a plurality of sample openings 34a, 34b, 34c, 34d, 34e which are provided in the carousel plate 30 for mounting the P3CNs 22a, 22b, 22c, 22d, 22e. To further enhance understanding of the autosampler 10 and its assembly, a single P3CN 22a is also shown in FIG. 5A phantom to show its position and orientation.

FIG. 5B provides a perspective view of the carousel 16 removed from the body 12 of the autosampler 10 and having the plurality of P3CNs 22a, 22b, 22c, 22d, 22e mounted thereto. In FIG. 5B, the autosampler 10 also includes the plurality of flow guards, 62a, 62b, 62c, 62d, 62e, each of which is shown in FIG. 5 B in phantom. Thus, FIG. 5B provides an understanding of the arrangement and assembly of the P3CNs 22a, 22b, 22c, 22d, 22e with the carousel 16, the flow guards 62a, 62b, 62c, 62d, 62e, and each other.

With reference back specifically to the P3CNs 22a, 22b, 22c, 22d, 22e, exemplary embodiments of the autosampler 10 may include two or more, or six or more, or preferably ten or more, P3CNs 22a, 22b, 22c, 22d, 22e. For example, the exemplary autosampler 10 shown in FIGS. 1-5B, includes fourteen P3CNs (not all of which are visible or labeled in each figure, but see FIG. 1t should, however, be noted that the autosampler 10 could include a plurality of P3CNs 22a, 22b, 22c, 22d, 22e that is less or greater than fourteen, at the discretion of persons of ordinary skill in the relevant art. The total number of P3CNs 22a, 22b, 22c, 22d, 22e will depend, at least in part, on factors such as the particulate solids content expected for the water source of interest, the desired rate of rotation of the carousel 16, the size of the carousel 16, the amount of water in each water sample to be provided to each P3CN 22a, 22b, 22c, 22d, 22e, the preferred or practical dimensions for each P3CN 22a, 22b, 22c, 22d, 22e, and other factors.

While the flow guards 62a, 62b, 62c, 62d, 62e are not required, they have been found to be useful and advantageous for stabilizing each P3CN 22a, 22b, 22c, 22d, 22e as it receives and filters water during operation of the autosampler 10. Due to the relative flexibility of the materials from which the P3CNs 22a, 22b, 22c, 22d, 22e are typically constructed (as described below) and depending on the volume and velocity of the flowing water provided to a P3CN 22a, 22b, 22c, 22d, 22e, the P3CN 22a, 22b, 22c, 22d, 22e in use may move, wave, or flap sideways, which may impact adjacent P3CNs 22a, 22b, 22c, 22d, 22e as well as decrease the control and/or efficient recapture of filtered water flowing from the P3CN 22a, 22b, 22c, 22d, 22e in use.

A typical P3CN 22a is shown in FIG. 6 separately from the autosampler 10, carousel 16 and corresponding flow guard 62a. As shown, each P3CN 22a generally has an upstream inlet end 24a for receiving water to be filtered for determining the presence of microplastics, and may also have an annular ring or washer 28a affixed to the upstream inlet end 24a to facilitate installation on the rotatable carousel 16 as described in further detail below. Each P3CN 22a also has a downstream end 26a, which may or may not be tapered as shown in the figures and through which filtered water leaves the P3CN 22. For any particular autosampler 10, all of the P3CNs 22a, 22b, 22c, 22d, 22e should be similarly sized and shaped. For example, but without limitation, each P3CN 22a, 22b, 22c, 22d, 22e of an autosampler 10 should have approximately the same length L as one another (see FIG. 6), and the washer 28a affixed to the upstream inlet end 24a of each P3CN 22a should have the same inner diameter ID and the same outer diameter OD as the others (see FIGS. 5A and 5B).

In some exemplary embodiments, each of the P3CNs 22a, 22b, 22c, 22d, 22e of an autosampler 10 has the same length L (see FIG. 6) which may, for example without limitation, be from about 12 inches to about 30 inches (in) (from about 30.48 centimeters to about 76.2 centimeters (cm). Additionally, in some exemplary embodiments, the inlet diameter D1 of the upstream inlet end 24a of each P3CN 22a may, for example without limitation, be from about 3 in to about 10 in (from about 7.62 cm to about 25.4 cm). Consequently, and with reference to FIGS. 5A and 5B, each washer 28a, 28b, 28c, 28d, 28e may, for example without limitation, have an inner diameter ID of from about 3.125 in to about 10.125 in (from about 7.94 cm to about 25.72 cm), a width of from about 0.75 in to about 1.25 in (from about 1.9 cm to about 3.18 cm), and an outer diameter OD of from about 3.875 in to about 11.375 in (from about 9.84 cm to about 28.9 cm). Additional structural features and functioning of the P3CNs 22a, 22b, 22c, 22d, 22e will be described in detail hereinbelow.

The rotatable carousel 16 includes a carousel plate 30 with a peripheral edge 32 and a plurality of sample openings 34a, 34b, 34c, 34d, 34e therethrough, each of which is proximate to and about the same distance (d) from the peripheral edge 32. The number of sample openings 34a, 34b, 34c, 34d, 34e through the carousel plate 30 of a carousel 16 of a particular autosampler 10 should be the same as the number of P3CNs 22a, 22b, 22c, 22d, 22e to be included in that autosampler 10. Furthermore, the plurality of sample openings 34a, 34b, 34c, 34d, 34e are spaced approximately evenly around the peripheral edge 32 of the carousel plate 30. Each of the plurality of sample openings 34a, 34b, 34c, 34d, 34e should have approximately the same diameter D2 as one another.

The diameter D2 (see FIGS. 5A-5B) of each of the plurality of sample openings 34a, 34b, 34c, 34d, 34e through the carousel plate 30 should be about the same or slightly larger than the inlet diameter D1 of the upstream inlet end 24a of the P3CNs 22a (see FIG. 6) to be included in the autosampler 10 and about the same or slightly larger than the inner diameter ID of the washer 28a affixed to the P3CN 22a (again, see FIG. 6). These relative dimensions allow each P3CN 22a, 22b, 22c, 22d, 22e to be mounted, by its respective upstream inlet end 24a, at a corresponding one 34*a* of the plurality of sample openings 34*a*, 34*b*, 34*c*, 34*d*, 34*e* (see FIGS. 5B and 6) through the carousel plate 30 and retained there. Based on the foregoing exemplary dimensions of the P3CNs 22*a* and their washers 28*a* mentioned above, the diameter D2 of each of the plurality of sample openings 34*a*, 34*b*, 34*c*, 34*d*, 34*e* through the carousel plate 30 may, for example without limitation, be from about 3.125 in to about 10.125 in (from about 7.94 cm to about 25.72 cm). As can be understood by reviewing FIGS. 5A, 5B and 6, when a P3CN 22*a* is installed in the carousel 16 of the autosampler 10, the washer 28*a* lies across a corresponding sample opening 34*a* and the P3CN 22*a* which is affixed to the washer 28*a* extends and hangs down through the sample opening 34*a*.

In an exemplary embodiment of the autosampler apparatus 10, in which the upstream inlet end 24*a* of each P3CN 22*a* is about 4 in (about 10.16 cm), the inner diameter ID of the washer 28*a* affixed thereto is about 4.125 in (10.48 cm), the outer diameter OD of the washer 28*a* is about 5 in (12.7 cm). In this embodiment, the diameter D2 of each of the sample openings 34*a*, 34*b*, 34*c*, 34*d*, 34*e* through the carousel plate 30 is about 4.125 in (10.48 cm).

As will be explained in further detail later, during operation of the autosampler 10, water is sequentially provided to the upstream inlet end (e.g., inlet end 24*a*) of each P3CN 22*a*, 22*b*, 22*c*, 22*d*, 22*e*, through an outlet end OE of a conduit C (see the arrows W in each of FIGS. 1-6 for direction of water flow). The conduit C also, of course, has an inlet end (not shown per se) in fluid communication with the water source (not shown). The conduit C may be a pipe or other rigid device as shown in the figures, or a tube, hose or other flexible device (not shown per se). A valve V may be installed in fluid communication with the conduit C, upstream of the outlet end OE for opening and closing the valve V and controlling the flow of water through the conduit C and to the autosampler 10. It should be understood that the conduit C and valve V are not considered parts or components of the autosampler 10, but rather are features of the environment in which the autosampler 10 may be used (i.e., positioned and effectively operated).

Regardless of whether the conduit C is rigid or flexible, for reasons which will become apparent in connection with the operation of the autosampler 10 described below, the outlet end OE of the conduit C should be positioned in a fixed location. Furthermore, that fixed location should enable placement of the autosampler 10 relative to the conduit C such that the outlet end OE is proximate to the carousel 16 and in alignment with the upstream inlet end 24*a* of each respective P3CN 22*a* as the carousel 16 is rotated, as described in further detail hereinbelow.

During operation and use of the autosampler 10, the carousel 16 is intermittently rotated (see axis of rotation R in FIGS. 1 and 5A-5B) to align the outlet end OE of the conduit C, sequentially, with each one of the sample openings 34*a*, 34*b*, 34*c*, 34*d*, 34*e* through the carousel plate 30. Of course, each sample opening 34*a*, 34*b*, 34*c*, 34*d*, 34*e* has a corresponding P2CN 22*a*, 22*b*, 22*c*, 22*d*, 22*e* mounted thereto for receiving water flowing from the outlet end OE of the conduit C. Upon alignment of the outlet end OE with a sample opening, for example sample opening 34*b* as shown in FIG. 4, rotation of the carousel 16 is paused for a predetermined period of sampling time, which allows a desired predetermined quantity (volume) of water (sample size) to pass through the corresponding P3CN 22*a* for detection and separation of microplastics therefrom.

The rate of rotation of the carousel 16 is selected by a user or operator of the autosampler 10 based on the desired period of time (i.e., sampling time) for which rotation of the carousel 16 is paused and each P3CN 22*a*, 22*b*, 22*c*, 22*d*, 22*e* of the autosampler 10 remains aligned with the outlet end OE of the conduit C and, therefore, is receiving water which passes through and is filtered by the aligned P3CN 22*a*, 22*b*, 22*c*, 22*d*, 22*e*. As will be understood and determinable by persons of ordinary skill in the relevant art, the rate of rotation of the carousel 16 and the sampling time for which each P3CN 22*a*, 22*b*, 22*c*, 22*d*, 22*e* is receiving water may be determined and selected according to several factors, including without limitation, the total number of P3CNs 22*a*, 22*b*, 22*c*, 22*d*, 22*e* mounted to the carousel 16, the flow rate of water flowing from the outlet end OE of the conduit C, the total quantity of water desired to be provided to each P3CN 22*a*, 22*b*, 22*c*, 22*d*, 22*e* (i.e., the P3CN sample size), the total quantity of water desired to be passed through the plurality of P3CNs 22*a*, 22*b*, 22*c*, 22*d*, 22*e* (i.e., the total sample size, which equals the sum of all P3CN sample sizes).

Optionally, if is desirable to calculate the concentration of particulate solids, such as microplastics, which were present in the water samples provided to the autosampler 10 (and, consequently, in the water source) and which were captured and separated by the P3CNs 22 of the autosampler 10, then a flowmeter 35 may be installed in fluid communication with the conduit C, upstream from or at the outlet end OE and, preferably but not necessarily, downstream from the valve V. The type of flowmeter 35 is not particularly limited and should be capable of measuring and reporting the flow rate of the water flowing through the conduit C as well as the cumulative flow volume of water provided to the autosampler 10, or more particularly, provided to each P3CN 22 for the duration of a sampling time. With this information, and after each respective P3CN 22 is removed from the autosampler 10 and the mass or other quantity of particulate solids, such as microplastics, determined by any of several methods known and practiced by persons of ordinary skill in the relevant art, the concentration (e.g., milligrams per liter, parts per million, etc.) of such particulate solids in the water samples (and water source) can easily be calculated by persons of ordinary skill.

With reference back to FIGS. 1-4, the autosampler body 12 is generally configured to partially enclose the rotatable carousel 16 therein. The body 12 comprises a top plate 36, a bottom plate 38, and a vertical wall 40 extending between the top and bottom plates 36, 38. While the top and bottom plates 36, 38 are most effective when sized and shaped similarly, i.e., with coextensive dimensions as shown in FIGS. 1-4, they do not have to be. Also, although the top and bottom plates 36, 38 are shown in FIGS. 1-4 as being semicircular, they can be any other shape, as long as a first gap or recess 42 is provided in the top plate 36 for water to flow past the top plate 36 and into a P3CN 22 aligned with an outlet end OE of a conduit C providing the water to be filtered, and a second gap or recess 44 is provided in the bottom plate 38 for the filtered water to flow from the P3CN 22, past the bottom plate 38 and out of the autosampler apparatus 10. Of course, the legs 14*a*, 14*b*, 14*c* of the autosampler 10 should extend a distance or height (H) below the bottom plate 38 the autosampler body 12 that is greater than the length of the P3CNs 22.

The vertical wall 40 of the body 12 is shown in FIGS. 1-4 as extending only partially around and, therefore, only partially surrounding the carousel 16, thereby allowing easy visual and physical access to the carousel 16 and the plurality of P3CNs 22 mounted thereon. It should, however, be understood that other configurations for the body 12 and vertical wall 40 are possible, including without limitation, where the vertical wall 40 forms a cylinder and completely surrounds the carousel 16 (not shown in the figures).

The autosampler 10 generally also includes a programmable logic controller (PLC) 46 which is capable of and used to controls several components and aspects of the operation of the autosampler. For example, without limitation, the PLC is capable of receiving a selected sampling time and selected speed or rate of rotation of the carousel 16 and communicating this information to the rotation motor 18, thereby controlling rotation of the carousel 16. Optionally, the valve V may have an actuator (A) connected thereto for partially or fully opening and closing the valve V and, thereby, controlling the flowrate of the water flowing through the conduit C to the autosampler and each P3CN 22. In such cases where an actuator (A) is present on the valve V, the PLC uses the programmed selected sampling time and rate of rotation of the carousel 16 for controlling the valve V and controlling the flowrate of water that will be conveyed to each P3CN of the autosampler 10.

In other words, a user may select a desired flowrate that would be set as a target in the PLC, which in turn would adjust the opening and closing of the valve V according to variations of the pressure or flow of the incoming water source to adjust and produce the desired constant flow into each of the P3CNs 22 at any given time. In the foregoing arrangement, the rotation motor 18 rotates the vertical shaft 20 according to the selected rate of rotation communicated by the PLC 46, which in turn rotates the carousel 16 at the selected rate of rotation, which provides the selected sampling time and the desired P3CN sample size.

In an exemplary embodiment, for example without limitation, using the autosampler shown in FIGS. 1-5B which includes fourteen P3CNs 22a, 22b, 22c, 22d, 22e (not all are individually labeled), each of which is affixed to a respective one of fourteen evenly spaced sample openings 34a, 34b, 34c, 34d, 34e through the rotating carousel 16, the rate of rotation may be set for one full rotation of the carousel 16 every seven days, and pausing each P3CN 22a, 22b, 22c, 22d, 22e in alignment with the outlet end OE of the conduit C for about 12 hours. This will result in water passing through and being filtered by each P3CN 22a, 22b, 22c, 22d, 22e for a sampling period of 12 hours. The selected rate of rotation and sampling period are not particularly limited and may be determined by taking into account any of several factors such as, but not limited to, the time available as a practical matter for sampling water and determining whether microplastics or other particulate solids are present therein, the anticipated concentration in the water of microplastics or other particulate solids and the size of the samples likely necessary to accurately determine the actual concentration, and other factors.

Optionally, a carousel locking system may be included with the autosampler 10 to assist and facilitate controlled intermittent rotation of the carousel 16 on a desired predetermined schedule of sample time and sizes, as described above. Generally, the carousel locking system intermittently and sequentially locks the rotating carousel 16 (and P3CNs 22a, 22b, 22c, 22d, 22e mounted thereto), and thereby pauses rotation for a selected period of time as discussed above, when the outlet end OE of the conduit C is aligned with a sample opening 34a, 34b, 34c, 34d, 34e and a corresponding P3CN 22a, 22b, 22c, 22d, 22e mounted thereto. This locking of the carousel 16 minimizes or prevents the carousel 16 from unintentional movement while a desired predetermined quantity of water is provided to the selected P3CN 22a, 22b, 22c, 22d, 22e. The programmable logic controller (PLC) 46 described above may also be programmed to operate the carousel locking system and its components in coordination with rotation of the carousel 16 at a selected rate of rotation to provide a selected sampling time and desired P3CN sample size.

More particularly, with reference particularly to FIGS. 1, 2, and 5A-5B, in an exemplary embodiment, the carousel locking system may comprise a pressure bar lock system 70, which includes a motor 72, such as an air pressure motor, and a bar lock 74 having a contact end 76 which is sized and shaped for lockingly engaging a mating feature provided on the carousel plate 30. The motor 72 is connected to and capable of moving the bar lock 74, reciprocatingly, between a retracted unlocked position and an extended locked position (see direction shown by arrow D in FIGS. 5A-5B).

In the exemplary embodiment shown in FIGS. 4 and 5A-5B, the mating feature on the carousel plate 30 comprises a plurality of lock openings 80a, 80b, 80c, 80d, 80e which are distributed proximate the peripheral edge of the plate 30, with one lock opening 80a, 80b, 80c, 80e proximate a corresponding sample opening 34a, 34b, 34c, 34d, 34e on the carousel plate 30. As shown in FIGS. 4 and 5A-5B, there is a lock opening 80a, 80b, 80c, 80d, 80e between each adjacent pair of P3CNs 22a, 22b, 22c, 22d, 22e.

The contact end 76 of the bar lock 74 is sized and shaped to be sequentially and securely received within each of the lock opening 80a, 80b, 80c, 80d, 80e for halting or pausing rotation of the carousel 16. As previously described, the embodiment of the autosampler 10 shown in FIGS. 1-5B includes fourteen sample openings 34a, 34b, 34c, 34d, 34e and fourteen corresponding P3CNs 22a, 22b, 22c, 22d, 22e. Consequently, although not all are visible in the figures, there are also fourteen lock openings 80a, 80b, 80c, 80d, 80e on the carousel plate 30.

In the retracted unlocked position of the bar lock 74, its contact end 76 is not in contact with the carousel plate 30 or any lock opening 80a, 80b, 80c, 80d, 80e, and the carousel 16 is free to rotate until a sample opening 34a and corresponding P3CN 22a, which is mounted thereto, are aligned with the outlet end OE of the conduit C. After such alignment is achieved, the motor 72 moves the bar lock 74 from the retracted unlocked position to the extended locked position, so that the contact end 76 of the bar lock 74 moves toward the carousel plate 30. In the extended locked position of the bar lock 74, the contact end 76 of the bar lock 74 is securely received and mated in one of the lock openings 80a, 80b, 80c, 80d, 80e. In this extended locked position, one of the sample openings 34a, 34b, 34c, 34d, 34e and its corresponding P3CN 22a, 22b, 22c, 22d, 22e are and remain aligned with the outlet end OE of the conduit C for the selected predetermined period of sampling time.

Additional structural features and functions of the plurality of P3CNs 22a, 22b, 22c, 22d, 22e will now be described with reference to FIGS. 5A, 5B, and 6. The P3CNs 22a, 22b, 22c, 22d, 22e are designed to separate and capture microplastics, and other particulate solids, from water by size exclusion filtration. As used herein, "size exclusion filtration" means successive separation and capture of fractions or populations of differently sized solid particles from a fluid such as water or air, beginning with the largest sized solid particles and ending with the smallest sized solid particles to be separated. In the present case, size exclusion filtration is described as performed by the P3CNs 22a, 22b, 22c, 22d, 22e which separate and capture microplastics from water in successively smaller sizes.

Generally, each P3CN 22a, 22b, 22c, 22d, 22e includes at least one compartment which comprises a mesh or other filter having aperture or pore size selected to capture and separate a desired size fraction of microplastics from the water flowing through the P3CN 22a, 22b, 22c, 22d, 22e. In some embodiments, the P3CN 22a, 22b, 22c, 22d, 22e includes two or more compartments, which are nested together and each of which comprises a mesh or other filter having an aperture or pore size, each of which is selected to capture and separate a different size fraction of microplastics from the water flowing through the P3CN 22a, 22b, 22c, 22d, 22e. Of course, it should be understood that any P3CN 22a, 22b, 22c, 22d, 22e may include more than two such compartments for capture and separation of more than two different size fractions of microplastics from the water.

For example, in the exemplary embodiment shown in FIG. 6, an exemplary P3CN 22a is shown and includes a first net 48, which is at least partially nested within a second net 50. The first net 48 comprises a relatively coarse first mesh which has pores or apertures of size from about in to about 0.03125 in (from about 1.5875 millimeters (mm) to about 0.79375 mm) and captures coarser microplastic pellets and broken pellets (i.e., those having a size of about 0.79375 mm or greater, depending on the first mesh and its aperture size) from water which flows through the P3CN 22a. The second net 50, which at least partially surrounds the first net 48, comprises a smaller, finer second mesh which has pores or apertures of approximately 500 to 200 microns (or even smaller, finer mesh) that is designed to trap smaller microplastic powders (i.e., having sizes of about 200 microns or greater, depending on the second mesh and its aperture size).

Each P3CN 22a also typically includes a net body 52 which surrounds both the first and second nets 48, 50 and which defines and extends the entire length L of the P3CN, from the upstream inlet end 24a which is affixed to the washer 28a and through which water to be filtered enters the P3CN 22a, to the downstream end 26a, through which filtered water leaves the P3CN 22a. The net body 52 comprises a second coarse mesh having pores or apertures of size from about in to about 0.03125 in (from about 1.5875 millimeters (mm) to about 0.79375 mm).

Without intending to be limited, in an exemplary embodiment, after construction but prior to installation in a sample opening 34a of the rotatable carousel 16, a P3CN 22a has the configuration of a generally rectilinear-shaped pouch (i.e., the net body 52) having smaller pouches (i.e., the first and second nets 48, 50) nested therein as described above. The nets 48, 50 and net body 52 are assembled as described above and affixed to one another by any suitable means including, but not limited to, sewing, stapling, gluing with adhesive, etc. In the exemplary embodiment shown in the figures, the aforesaid components (i.e., first and second nets 48, 50 and net body 52) of the P3CN 22a are sewn together in the above described configuration.

Looking collectively at FIGS. 1, 5A, 5B, and 6, during operation of the autosampler water to be filtered for determining whether and in what concentration microplastics are present therein, flows (in the direction shown by arrow W) out of the outlet end OE of the conduit C and into the inlet end 24a of the P3CN 22a and first encounters the first net 48 which comprises the coarser larger first mesh which filters and captures larger, coarser microplastic particles, as described above, while the water and any remaining smaller microplastics continue flowing. Thereafter, the water and any remaining microplastics contained therein encounter the second net which comprises the finer second mesh which filters and separates smaller, finer microplastics, such as microplastic powder. After water has passed through an entire P3CN 22a and been filtered by the first and second nets 48, 50, the water flows out of the P3CN 22a through the downstream end 26a thereof, and out of the autosampler 10. When the autosampler 10 is set or positioned in a sump, pit, or reservoir (not shown), the filtered water may be collected and redirected away from the autosampler 10.

Especially, but not only, for embodiments of P3CNs 22a which include more than one net 48, 50 for capturing and separating different size fractions of microplastics as described above, each such net 48, 50 may include a cutting guide line for providing an operator or user with a location at which to cut each mesh compartment and enable easy and efficient removal and examination of each size fraction of microplastics captured by the nets 48, 50 of the P3CN 22a. For example, as shown most clearly in FIG. 6, but also see FIGS. 5A-5B, each of the first and second nets 48, 50 may include a cutting guide line L1, L2, respectively, to indicate to an operator or other user where to cut each net compartment 48, 50 for separation of the nets 48, 50 from the net body 52 and each other, as well as removal and examination of each size fraction of microplastics captured by each net 48, 50 of the P3CN 22a.

The foregoing design of the autosampler 10 and plurality of P3CNs 22a, 22b, 22c, 22d, 22e enables more accurate detection and capture of both pellet and powder microplastic size fractions easily. The P3CNs 22a, 22b, 22c, 22d, 22e are easily installed and retained in their respective sample openings 34a, 34b, 34c, 34d, 34e of the rotatable carousel 16 and, after operation of the autosampler 10 for the desired period of time, using a selected rate of rotation and sampling period, the P3CNs 22a, 22b, 22c, 22d, 22e are easily removed from the carousel 16 and visually examined for the presence of microplastics of various sizes.

Many modifications and other embodiments of the invention described and contemplated herein will be apparent to persons of ordinary skill in the relevant art, in addition to those already mentioned above. All such modification and alternative embodiments are intended to be within the scope of the invention described and contemplated herein. Accordingly, the invention is not limited to the modifications or alternative embodiments described and suggested hereinabove.

The invention claimed is:

1. An autosampler apparatus for automated monitoring and detection of microplastics present in water, the autosampler apparatus comprising:

an autosampler body including: a top plate having a top plate edge, a bottom plate having a bottom plate edge which is coextensive with the top plate edge, a vertical wall extending between the top and bottom plates, and extending at least partially along the coextensive top plate edge and bottom plate edge; and three or more legs securely mounted to the autosampler body and which support and maintain the bottom plate of the autosampler a distance above ground level or other surface upon which the autosampler rests;

a vertical shaft rotatably disposed within the autosampler body, wherein the vertical shaft extends at least from the top plate to the bottom plate and defines an axis of rotation within the autosampler body;

a rotatable carousel disposed within the autosampler body and comprising a carousel plate having peripheral edge and a geometric center to which the vertical shaft is statically affixed, intermediate the top plate and bottom plate of the autosampler body, for rotating the carousel within the autosampler body, wherein the carousel plate has a plurality of sample openings therethrough which are distributed symmetrically and evenly around and proximate to the peripheral edge;

a rotation motor which is mounted on the autosampler body, is in communication with the vertical shaft, and is capable of rotating the rotatable carousel via the vertical shaft; and a plurality of plastic pellet and powder capture nets (P3CNs) for receiving and filtering water which is provided thereto to detect the presence of microplastics in the water, wherein each P3CN has an upstream inlet end and an opposite downstream end, wherein each P3CN is mounted by its upstream inlet end to, in fluid communication with, a respective one of the plurality of sample openings, proximate the peripheral edge of the carousel plate and extending vertically downward from the carousel plate, and further wherein one or more of the plurality of P3CNs includes two or more compartments, which are at least partially nested together and each of which comprises a filter selected from a mesh and a net, and having an aperture or pore size which is selected to capture and separate a different size fraction of microplastics from water flowing through the one or more P3CNs, wherein the two or more compartments comprise at least a first filter comprising a relatively coarse first mesh and captures coarser microplastic pellets and broken pellets, and a second filter which at least partially surrounds the first filter and comprises a smaller, finer second mesh for trapping smaller microplastic powders.

2. The autosampler apparatus of claim 1, wherein water provided to one of the plurality of sample openings flows through a corresponding one of the plurality of P3CNs mounted thereto, from the upstream inlet end to the downstream end thereof.

3. The autosampler apparatus of claim 1, wherein each of the one or more P3CNs further includes a net body which surrounds both the first and second filters and extends from the upstream inlet end of the each of the one or more P3CNs to the downstream end thereof, wherein the net body comprises a second coarse mesh.

4. The autosampler apparatus of claim 3, wherein each of the first and second filter include a cutting guide line, respectively, to indicate to an operator or other user where to cut each filter for separation of the filters from the net body and each other, as well as removal and examination of each size fraction of microplastics captured by each filter.

5. The autosampler apparatus of claim 1, wherein each of the plurality of P3CNs has a P3CN length, the longest of which is less than the distance of the bottom plate of the autosampler from the ground level or other surface upon which the autosampler rests.

6. The autosampler apparatus of claim 1, wherein the plurality of P3CNs comprises twelve or more P3CNs.

7. The autosampler apparatus of claim 1, wherein the top plate has a first recess for allowing water to enter the autosampler body, and the bottom plate has a second recess substantially aligned with the first recess for allowing water to exit the autosampler body after being filtered.

8. The autosampler apparatus of claim 7, wherein rotation of the carousel sequentially aligns each of the plurality of P3CNs with and between the aligned first and second recesses of the top and bottom plates, respectively, of the autosampler body, which further enables water to be sequentially provided to each of the plurality of P3CNs through the first recess.

9. The autosampler apparatus of claim 1, further comprising a plurality of flow guards, each of which is mounted to and extends downward from carousel plate and surrounds a corresponding one of the plurality of P3CNs, each flow guard having an open bottom end for allowing water leaving the corresponding one of the plurality of P3CNs to continue on and leave the flow guard and autosampler body.

10. The autosampler apparatus of claim 1, wherein at least one of the plurality of P3CNs comprises an annular ring affixed to the upstream inlet end thereof for facilitating mounting to the corresponding one of the plurality of sample openings of the carousel plate.

11. The autosampler apparatus of claim 1, wherein at least one of the plurality of P3CNs is tapered from the upstream inlet end to the downstream end.

12. The autosampler apparatus of claim 1, wherein the vertical wall of the autosampler body extends partially along the coextensive top plate edge and bottom plate edge and, consequently, only partially surrounds the carousel disposed within the autosampler body, thereby allowing easy visual and physical access to the carousel and the plurality of P3CNs mounted thereon.

13. The autosampler apparatus of claim 1, further comprising a programmable logic controller (PLC) for controlling one or more components of the autosampler and operation of the autosampler, wherein the PLC is capable of receiving a selected sampling time and a selected speed or rate of rotation of the carousel and communicating this information to the rotation motor, thereby controlling rotation of the carousel.

14. The autosampler apparatus of claim 1, wherein water is provided to the autosampler apparatus through a conduit and a valve is provided on the conduit for controlling flowrate of the water therethrough.

15. The autosampler apparatus of claim 1, wherein water is provided to the autosampler apparatus through a conduit and a valve is provided on the conduit for controlling flowrate of the water therethrough, and wherein an actuator is connected to, and in programmable communication with, the valve, the actuator being capable of partially or fully opening and closing the valve, and wherein the PLC controls the flowrate of the water flowing through the conduit to the autosampler by controlling the actuator.

16. The autosampler apparatus of claim 1, further comprising a carousel locking system capable of pausing rotation of the carousel by intermittently and sequentially locking the carousel plate for a predetermined period of sampling time, wherein the carousel locking system comprises a mating feature on the carousel plate, a locking feature which is movable between an unlocked position in which the carousel is free to rotate and a locked position in which rotation of the carousel plate is prevented.

17. The autosampler apparatus of claim 16, further comprising a programmable logic controller (PLC) for controlling one or more components of the autosampler and operation of the autosampler, wherein the PLC is capable of receiving a selected sampling time and a selected speed or rate of rotation of the carousel and communicating this information to the rotation motor and the motor of the carousel locking system, thereby controlling rotation of the carousel and pausing of the rotation of the carousel.

18. The autosampler apparatus of claim 16, wherein the mating feature comprises a plurality of lock openings which are symmetrically and evenly distributed proximate the peripheral edge of the carousel plate, wherein each one of the plurality of lock openings is proximate a corresponding one of the plurality of sample openings and positioned in between each adjacent pair of the plurality of P3CNs; the locking feature comprises a bar lock having a contact end which is sized and shaped for lockingly engaging each one of the plurality of lock openings on the carousel plate, and a motor connected to and capable of reciprocatingly moving the bar lock between a retracted unlocked position in which the contact end is not in contact with the carousel plate or any lock opening, leaving the carousel free to rotate, and an extended locked position in which the contact end of the bar lock is securely received and mated in one of the plurality of lock openings.

19. A method for sampling and detecting the presence of microplastics in water using the autosampler apparatus of claim 1, wherein the plurality of P3CNs comprises a total of N P3CNs, where N equals two or more, the method comprising:

confirming that the autosampler apparatus is positioned proximate an open end of a conduit, wherein the open end is aligned with an accessible one of the plurality of sample openings and the corresponding one of the plurality of P3CNs mounted thereto which is now the aligned P3CN;

delivering water from a water source, at a selected flow-rate, through the open end of the conduit, into the upstream inlet end of the aligned P3CN, through the aligned P3CN, and allowing filtered water to exit the downstream end of the aligned P3CN;

automatically sampling the water, in predetermined water sample sizes and quantity of water samples for the presence of microplastics, over a selected total sampling period, by performing the sequential steps of:

pausing rotation of the carousel for a predetermined period of sampling time;

after passage of the selected sample time, rotating the carousel until a next one of the plurality of P3CNs, which is adjacent the aligned P3CN, is now aligned with the open end of the conduit and now becomes the aligned P3CN;

repeating the sequential steps of pausing rotation and rotating the carousel a number of times equal to (N−1), so that each of the N number of P3CNs is used for filtering the water over the selected total sampling period.

20. The method of claim 19, wherein N equals 12 so that the plurality of P3CNs comprises 12 P3CNs, the predetermined period of sampling time is about 2 hours, and the selected total sample period is about 24 hours.

21. The method of claim 19, wherein the top plate has a first recess for allowing water to enter the autosampler body and the bottom plate has a second recess substantially aligned with the first recess for allowing water to exit the autosampler body after being filtered, and wherein the aligned P3CN is in vertical alignment with the aligned first and second recesses of the top and bottom plates, respectively, of the autosampler body.

22. An autosampler apparatus for automated monitoring and detection of microplastics present in water, the autosampler apparatus comprising:

an autosampler body including: a top plate having a top plate edge, a bottom plate having a bottom plate edge which is coextensive with the top plate edge, a vertical wall extending between the top and bottom plates, and extending at least partially along the coextensive top plate edge and bottom plate edge; and three or more legs securely mounted to the autosampler body and which support and maintain the bottom plate of the autosampler a distance above ground level or other surface upon which the autosampler rests;

a vertical shaft rotatably disposed within the autosampler body, wherein the vertical shaft extends at least from the top plate to the bottom plate and defines an axis of rotation within the autosampler body;

a rotatable carousel disposed within the autosampler body and comprising a carousel plate having peripheral edge and a geometric center to which the vertical shaft is statically affixed, intermediate the top plate and bottom plate of the autosampler body, for rotating the carousel within the autosampler body, wherein the carousel plate has a plurality of sample openings therethrough which are distributed symmetrically and evenly around and proximate to the peripheral edge;

a rotation motor which is mounted on the autosampler body, is in communication with the vertical shaft, and is capable of rotating the rotatable carousel via the vertical shaft; and 12 or more plastic pellet and powder capture nets (P3CNs) for receiving and filtering water which is provided thereto to detect the presence of microplastics in the water, wherein each P3CN has an upstream inlet end and an opposite downstream end, wherein each P3CN is mounted by its upstream inlet end to, in fluid communication with, a respective one of the plurality of sample openings, proximate the peripheral edge of the carousel plate and extending vertically downward from the carousel plate.

23. An autosampler apparatus for automated monitoring and detection of microplastics present in water, the autosampler apparatus comprising:

an autosampler body including: a top plate having a top plate edge, a bottom plate having a bottom plate edge which is coextensive with the top plate edge, a vertical wall extending between the top and bottom plates, and extending at least partially along the coextensive top plate edge and bottom plate edge; and three or more legs securely mounted to the autosampler body and which support and maintain the bottom plate of the autosampler a distance above ground level or other surface upon which the autosampler rests;

a vertical shaft rotatably disposed within the autosampler body, wherein the vertical shaft extends at least from the top plate to the bottom plate and defines an axis of rotation within the autosampler body;

a rotatable carousel disposed within the autosampler body and comprising a carousel plate having peripheral edge and a geometric center to which the vertical shaft is statically affixed, intermediate the top plate and bottom plate of the autosampler body, for rotating the carousel within the autosampler body, wherein the carousel plate has a plurality of sample openings therethrough which are distributed symmetrically and evenly around and proximate to the peripheral edge;

a rotation motor which is mounted on the autosampler body, is in communication with the vertical shaft, and is capable of rotating the rotatable carousel via the vertical shaft;

a carousel locking system capable of pausing rotation of the carousel by intermittently and sequentially locking the carousel plate for a predetermined period of sampling time, wherein the carousel locking system comprises a mating feature on the carousel plate, a locking feature which is movable between an unlocked position in which the carousel is free to rotate and a locked position in which rotation of the carousel plate is prevented; and a plurality of plastic pellet and powder capture nets (P3CNs) for receiving and filtering water which is provided thereto to detect the presence of microplastics in the water, wherein each P3CN has an upstream inlet end and an opposite downstream end, wherein each P3CN is mounted by its upstream inlet end to, in fluid communication with, a respective one of the plurality of sample openings, proximate the peripheral edge of the carousel plate and extending vertically downward from the carousel plate.

24. A method for sampling and detecting the presence of microplastics in water using an autosampler apparatus comprising:

an autosampler body and a rotatable carousel disposed therein and having a carousel plate;

the carousel plate having a plurality of sample openings therethrough which are distributed symmetrically and evenly around and proximate to a peripheral edge of the carousel plate, wherein the carousel plate is rotated by rotation of a vertical shaft statically affixed to a geometric center thereof, using a rotation motor which is mounted on the autosampler body; and a plurality of plastic pellet and powder capture nets (P3CNs) for receiving and filtering water which is provided thereto to detect the presence of microplastics in the water, wherein the plurality of P3CNs comprises a total of N P3CNs and N equals two or more, each P3CN having an upstream inlet end and an opposite downstream end, wherein each P3CN is mounted by its upstream inlet end to, in fluid communication with, a respective one of the plurality of sample openings, each P3CN extending vertically downward from the carousel plate, the method comprising:

confirming that the autosampler apparatus is positioned proximate an open end of a conduit, wherein the open end is aligned with an accessible one of the plurality of sample openings and the corresponding one of the plurality of P3CNs mounted thereto which is now the aligned P3CN;

delivering water from a water source, at a selected flowrate, through the open end of the conduit, into the upstream inlet end of the aligned P3CN, through the aligned P3CN, and allowing filtered water to exit the downstream end of the aligned P3CN;

automatically sampling the water, in predetermined water sample sizes and quantity of water samples for the presence of microplastics, over a selected total sampling period, by performing the sequential steps of:

pausing rotation of the carousel for a predetermined period of sampling time;

after passage of the selected sample time, rotating the carousel until a next one of the plurality of P3CNs, which is adjacent the aligned P3CN, is now aligned with the open end of the conduit and now becomes the aligned P3CN;

repeating the sequential steps of pausing rotation and rotating the carousel a number of times equal to (N−1), so that each of the N number of P3CNs is used for filtering the water over the selected total sampling period.

* * * * *